(12) United States Patent
Krenceski

(10) Patent No.: US 8,071,174 B2
(45) Date of Patent: Dec. 6, 2011

(54) CONDUCTIVE ELASTOMER AND METHOD OF APPLYING A CONDUCTIVE COATING TO ELASTOMERIC SUBSTRATE

(75) Inventor: Mary A. Krenceski, Troy, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 215 days.

(21) Appl. No.: 12/418,103

(22) Filed: Apr. 3, 2009

(65) Prior Publication Data

US 2010/0255320 A1 Oct. 7, 2010

(51) Int. Cl.
*B05D 3/02* (2006.01)

(52) U.S. Cl. .............. 427/384; 427/385.5; 427/387; 427/393.5

(58) Field of Classification Search .............. None
See application file for complete search history.

(56) References Cited

U.S. PATENT DOCUMENTS

| | | | |
|---|---|---|---|
| 4,971,727 A | 11/1990 | Takahashi et al. | |
| 5,227,093 A * | 7/1993 | Cole et al. | 252/512 |
| 5,359,735 A | 11/1994 | Stockwell | |
| 5,464,661 A | 11/1995 | Lein et al. | |
| 5,696,196 A | 12/1997 | DiLeo | |
| 5,770,216 A | 6/1998 | Mitchnick et al. | |
| 5,949,029 A | 9/1999 | Crotzer et al. | |
| 6,117,539 A | 9/2000 | Crotzer et al. | |
| 6,180,221 B1 | 1/2001 | Crotzer et al. | |
| 6,375,866 B1 | 4/2002 | Paneccasio, Jr. et al. | |
| 6,416,847 B1 | 7/2002 | Lein et al. | |
| 6,465,550 B1 * | 10/2002 | Kleyer et al. | 524/268 |
| 6,674,012 B2 * | 1/2004 | Beele | 174/140 R |
| 7,026,382 B2 * | 4/2006 | Akiba et al. | 524/268 |
| 2004/0018312 A1 * | 1/2004 | Halladay | 427/387 |
| 2005/0109994 A1 | 5/2005 | Matheson et al. | |
| 2007/0077360 A1 | 4/2007 | Kashiwagi et al. | |
| 2010/0239871 A1 * | 9/2010 | Scheffer et al. | 428/447 |

FOREIGN PATENT DOCUMENTS

| | | |
|---|---|---|
| JP | 2004176005 A | 6/2004 |
| WO | 2008066995 A2 | 6/2008 |

OTHER PUBLICATIONS

PCT/US2010/029593 International Filing Date: Apr. 1, 2010; International Search Report and Written Opinion; Mailed Date: Nov. 12, 2010; 12 pages.

Flexible, High Temperature, Electrically Conductive Adhesive. Creative Materials, Inc. [online]. 1 page [retrieved on Jun. 22, 2011]. Retrieved from the Internet<URL: http://server.creativematerials.com/datasheets/DS_102_32.pdf>.

* cited by examiner

*Primary Examiner* — Erma Cameron

(74) *Attorney, Agent, or Firm* — Schmeiser, Olsen & Watts, LLP

(57) ABSTRACT

A method for forming a conductive elastomer by applying or spray coating a conductive paste onto an elastomeric substrate using a reactive top coat to thin the conductive paste prior to spraying onto the substrate. The use of a reactive topcoat to thin the conductive paste avoids the need for hazardous volatile organic components as solvents to thin the conduct paste and improves the bonding of the conductive paste to the elastomeric substrate once the spray coating is cured.

12 Claims, 1 Drawing Sheet

CONDUCTIVE ELASTOMER AND METHOD OF APPLYING A CONDUCTIVE COATING TO ELASTOMERIC SUBSTRATE

BACKGROUND OF THE INVENTION

1. Field of the Invention

The present invention relates to conductive coatings and, more particularly, a method for applying a silver-based conductive coating to silicone rubber.

2. Description of the Related Art

Conductive elatomers are useful for a variety of purposes, including the shielding of electrical components from electromagnetic interference and radio frequency interference. One method for forming such conductive elastomers typically involves forming the elastomers from a conductive material, such as forming from multiple layers of conductive and non-conductive materials into a composite that is both elastic and conductive by a rubber impregnated with conductive particles. Another method is to spray a conductive coating including conductive particles, such as copper and/or silver flakes, onto an elastomeric substrate.

While these methods of forming conductive elastomers are useful, there are significant drawbacks, particularly with regard to the spray coating of a conductive substance onto an elastomeric substrate. For example, the conductive solution must be diluted with solvents containing volatile carbon compounds (VOCs), such as toluene, prior to spray coating. These VOCs are hazardous to workers and the environment due to hydrocarbon off-gassing during the manufacturing process. In addition, these VOCs do not necessarily promote effective bonding to the substrate and are therefore not as flexible as the substrate.

BRIEF SUMMARY OF THE INVENTION

It is therefore a principal object and advantage of the present invention to provide a safe method for applying conductive coating to elastomeric substrates.

It is a further object and advantage of the present invention to provide a method for applying conductive coatings that improves the bonding between the conductive solution and the substrate.

It is an additional object and advantage of the present invention to provide a method for applying conductive coatings that does not adversely affect the flexibility of the substrate.

It is another object and advantage of the present invention to provide a method for applying conductive coatings that may be sprayed on irregular surfaces and confined to only those surfaces that are desired to be conductive.

In accordance with the foregoing objects and advantages, the present invention provides a method for spray coating a conductive ink onto an elastomeric substrate that reduces the need for toxic compounds and improves bonding between the conductive ink and substrate. The method comprises the use of reactive top coats formulated for use with silicone rather than solvents to achieve thinning of the conductive ink. The thinned ink may then be spray coated onto silicone elements to provide a conductive layer that is bonded to the silicone and that does not off-gas hydrocarbons during the manufacturing process.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
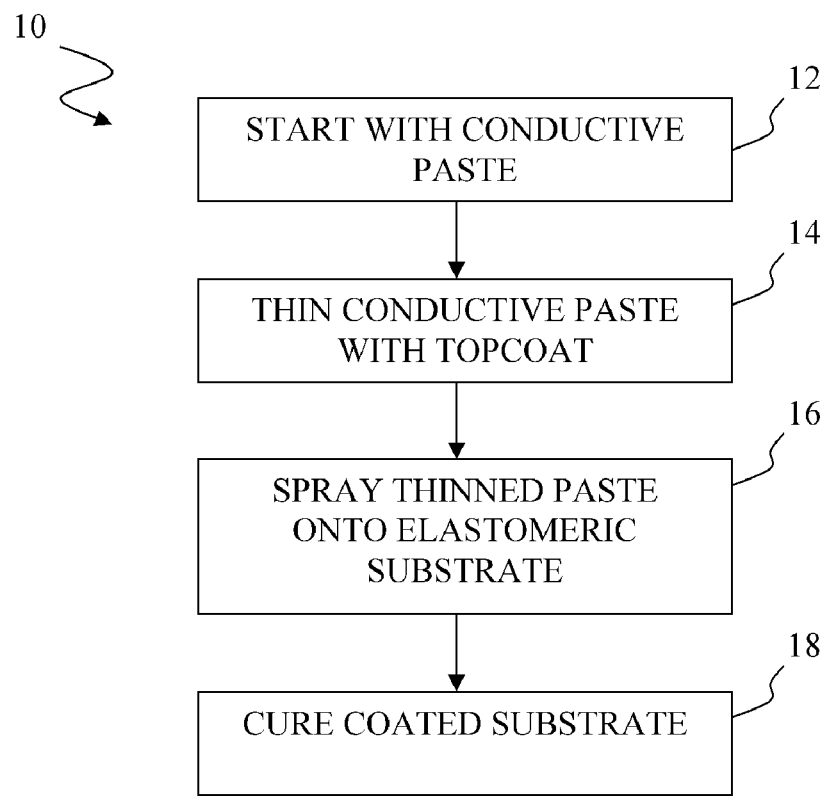
FIG. 1 is a flowchart of a method according to the present invention.

Referring now to the drawings, wherein like reference numerals refer to like parts throughout, there is seen in FIG. 1, a flowchart of a method 10 according to the present invention for applying conductive coatings to elastomeric substrates. Method 10 begins with a conductive ink or paste 12. A conductive paste that is acceptable for use with the method of the present invention is silver 102-32 paste, available from Creative Materials, Inc. of Tyngsboro, Mass. The conductive ink or paste is then thinned 14 using a reactive topcoat rather than an organic solvent. For silver 102-32 paste, an effective topcoat is a mixture of liquid silicone rubber topcoat (LSR) TP3719A and TP3719B, both of which are available from Momentive Performance Materials of Leverkusen, Germany. The LSR Topcoat TP3719A and B are preferably mixed in a 1:1 weight ratio. For example, the LSR topcoat may be mixed in a ratio of 10.2 grams of topcoat A to 10.4 grams of topcoat B to form an LSR topcoat A/B mixture. Five grams of silver 102-32 may then be mixed with one gram of the LSR topcoat A/B mixture and stirred to form a topcoat thinned ink that can be applied, such as by spray coating and the like, onto the silicone substrate using conventional applying or spraying processes, including without limitation, the use of an airbrush. Alternatively, a mixture of 5.2 grams of silver 102-32 paste and 2 grams of the LSR topcoat A/B mixture may also be used to form the topcoat thinned ink.

Figure 2:
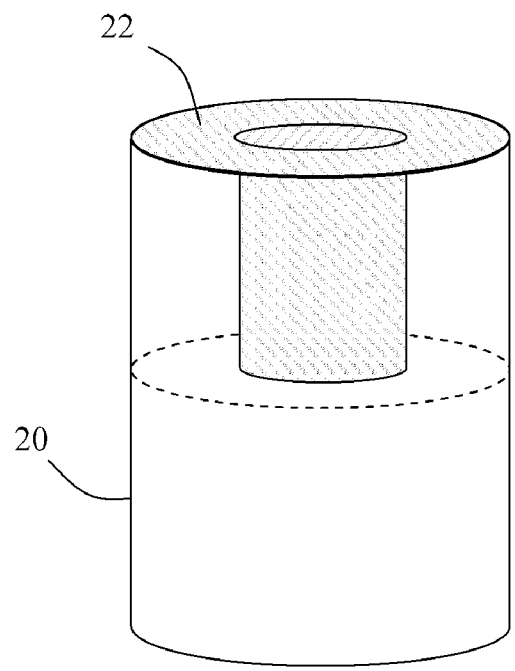
FIG. 2 is a perspective view of a silicone element treated according to the present invention to have a spray coating of conductive ink thinned using a reactive topcoat.

The topcoat thinned paste is then applied or sprayed 16 onto the desired elastomeric substrate, such as by spray coating using an air brush or other conventional applying or spraying apparatus. Preferably, the elastomeric substrate comprises a silicone element or sleeve used in electrical devices or connectors. Referring to FIG. 2, an elastomeric substrate 20, such as a silicone cable connector part may be sprayed with the topcoat thinned paste 22 in appropriate locations where flexible conductivity is desired. The topcoat thinned paste according to the present invention may thus be sprayed on irregular surfaces and confined to only those surfaces that are desired to be conductive so that the rest of the substrate will retain its insulting qualities.

The coated substrate may then be cured 18 by drying in an oven or kiln to cure the topcoat thinned paste and bond it to the elastomeric substrate. For example, coated silicone substrates may be dried in an oven at 160 degrees Celsius for approximately 30 minutes to bond the thinned conductive silver paste to the substrate to form a conductive elastomer. The resulting conductive elastomer has a highly conductive and flexible skin without any of the dangerous off-gassing of hydrocarbons from volatile organic compounds used in the solvent.

What is claimed is:

1. A method of forming a conductive elastomer, comprising the steps of:

mixing a conductive paste with a reactive topcoat;

applying the topcoat and conductive paste mixture onto an elastomeric substrate comprising a silicone sleeve of a cable connector to at least partially coat the substrate; and curing the coated substrate to bond the topcoat and conductive paste to the substrate.

2. The method of claim 1, wherein the conductive paste comprises silver particles.

3. The method of claim 2, wherein the substrate is silicone.

4. The method of claim 3, wherein the topcoat is a liquid silicone rubber topcoat.

5. The method of claim 4, wherein the step of curing the coated substrate comprises heating the coated substrate in an oven.

6. The method of claim 1, wherein the step of applying the topcoat and conductive paste mixture comprises spray coating said mixture onto said elastomeric substrate.

7. The method of claim 6, wherein the step of spray coating the mixture onto said elastomeric substrate is performed by using an airbrush.

8. The method of claim 1, wherein the topcoat and conductive paste mixture is applied to an interior surface of the silicon sleeve.

9. The method of claim 8, wherein the interior surface comprises a cylindrical shape.

10. The method of claim 1, wherein the topcoat and conductive paste mixture is applied to a top surface of the silicon sleeve.

11. The method of claim 10, wherein the top surface comprises a circular shape with a center opening.

12. The method of claim 1, wherein the topcoat and conductive paste mixture is only applied to an interior surface and a top surface of the silicon sleeve.

* * * * *